(12) United States Patent
Todaka et al.

(10) Patent No.: US 12,130,094 B2
(45) Date of Patent: Oct. 29, 2024

(54) WATER JACKET AND METHOD OF MANUFACTURING WATER JACKET

(71) Applicant: HONDA MOTOR CO., LTD., Tokyo (JP)

(72) Inventors: Hirosumi Todaka, Saitama (JP); Yasunari Kimura, Saitama (JP); Takaaki Kobayashi, Tokyo (JP)

(73) Assignee: HONDA MOTOR CO., LTD, Tokyo (JP)

( * ) Notice: Subject to any disclaimer, the term of this patent is extended or adjusted under 35 U.S.C. 154(b) by 266 days.

(21) Appl. No.: 17/937,783

(22) Filed: Oct. 4, 2022

(65) Prior Publication Data

US 2023/0137009 A1   May 4, 2023

(30) Foreign Application Priority Data

Nov. 3, 2021   (CN) .......................... 202111294281.2

(51) Int. Cl.
| | |
|---|---|
| *H02K 9/19* | (2006.01) |
| *F28D 1/053* | (2006.01) |
| *F28F 13/12* | (2006.01) |
| *F28D 1/02* | (2006.01) |
| *F28D 21/00* | (2006.01) |

(52) U.S. Cl.
CPC .......... *F28F 13/12* (2013.01); *F28D 1/05316* (2013.01); *H02K 9/19* (2013.01); *F28D 2001/0273* (2013.01); *F28D 2021/0029* (2013.01)

(58) Field of Classification Search
CPC .. H02K 9/19; H02K 5/20; H02K 5/203; F28F 13/12; F28D 1/05316
See application file for complete search history.

(56) References Cited

U.S. PATENT DOCUMENTS

| | | | | |
|---|---|---|---|---|
| 5,616,973 | A * | 4/1997 | Khazanov | H02K 5/203 310/58 |
| 7,576,458 | B2 * | 8/2009 | Wehner | H02K 15/14 310/58 |
| 10,516,316 | B2 * | 12/2019 | Carrillo | H02K 5/18 |

FOREIGN PATENT DOCUMENTS

JP         2002119019 A      4/2002

\* cited by examiner

*Primary Examiner* — Leda T Pham
(74) *Attorney, Agent, or Firm* — CKC & PARTNERS CO., LLC

(57) ABSTRACT

A water jacket includes a housing configured to be disposed on or adjacent to an outer periphery of a heat generating portion, and a coolant channel provided inside the housing. The coolant channel includes a plurality of main tubular channel portions that extend linearly and are configured to be arranged along and in proximity to the outer periphery of the heat generating portion, an inflow-side manifold portion that collectively connects upstream end portions of the main tubular channel portions and is configured to allow inflow of coolant, and an outflow-side manifold portion that collectively connects downstream end portions of the main tubular channel portions and is configured to allow outflow of the coolant. Each of the main tubular channel portions includes therein a vortex generation part that is disposed in proximity to the upstream end portion and configured to generate a vortex flow.

4 Claims, 3 Drawing Sheets

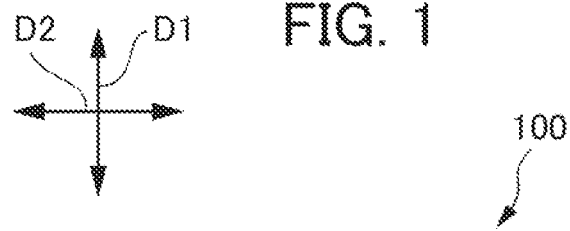
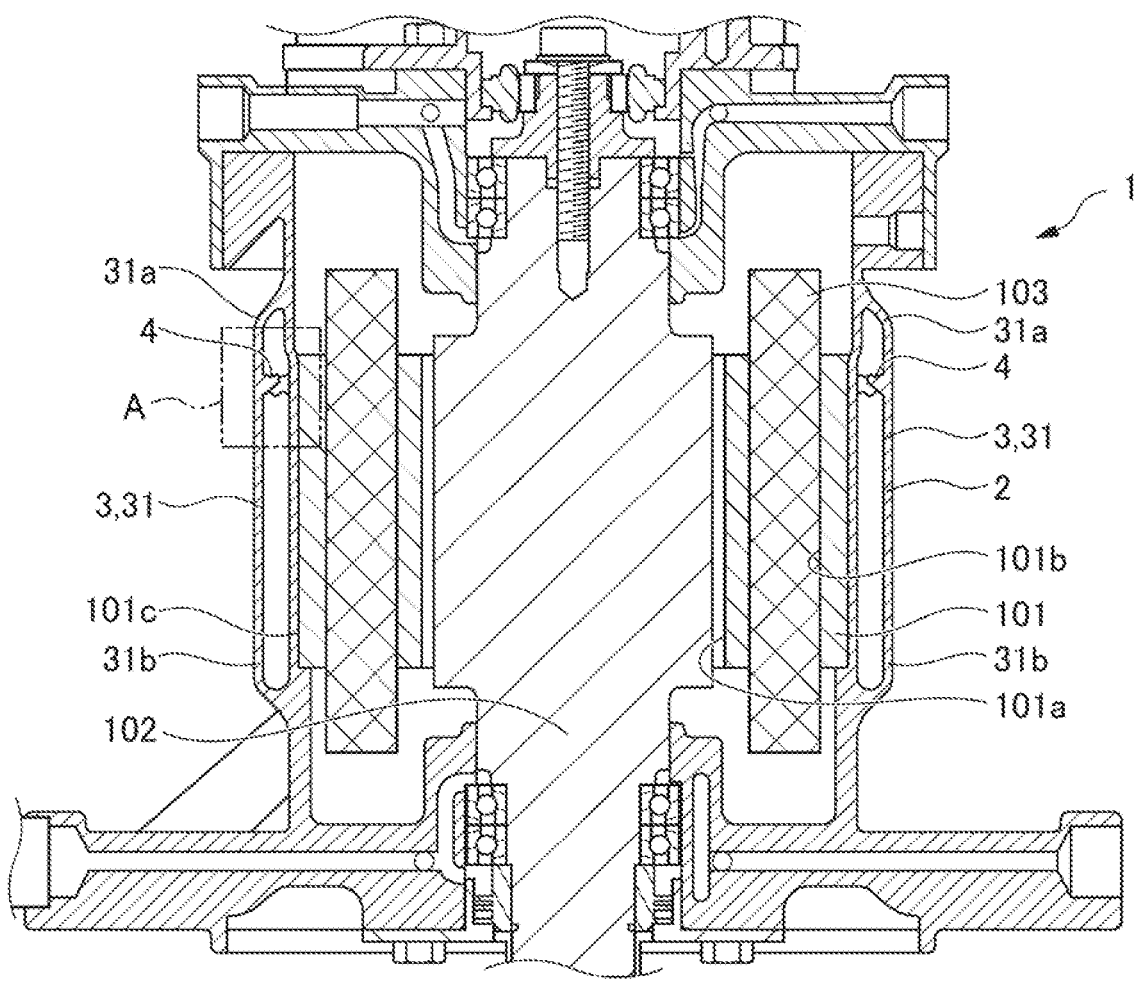

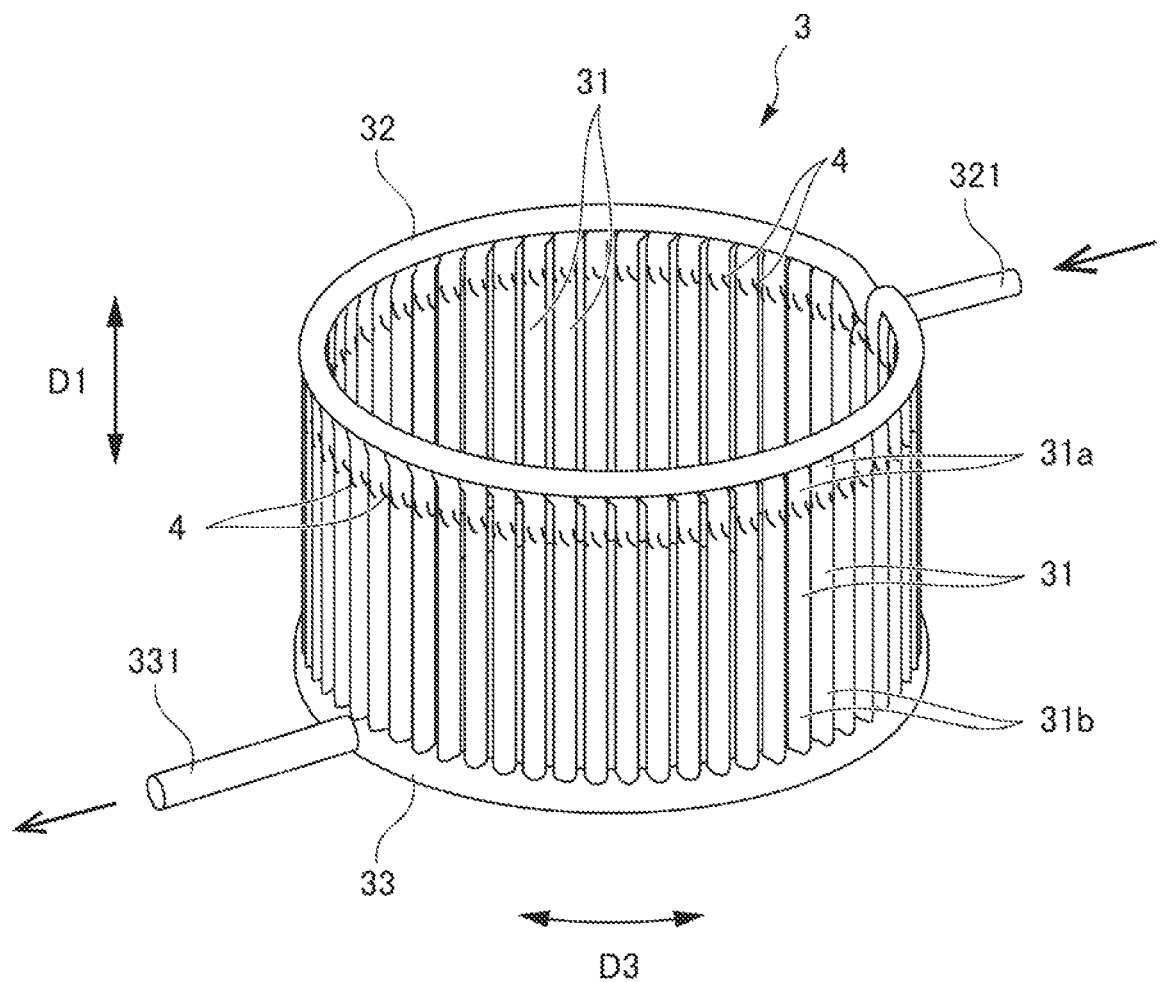

US 12,130,094 B2

WATER JACKET AND METHOD OF MANUFACTURING WATER JACKET

This application is based on and claims the benefit of priority from Chinese Patent Application No. 202111294231.2, filed on 3 Nov. 2021, the content of which is incorporated herein by reference.

BACKGROUND OF THE INVENTION

Field of the Invention

The present invention relates to a water jacket and a method of manufacturing such a water jacket.

Related Art

A water jacket of the known art is provided on a peripheral surface of a stator housing of an electric motor (for example, see Japanese Unexamined Patent Application, Publication No. 2002-119019). This water jacket is provided with a turbulence generating member at a coolant Inlet of a coolant jacket. The turbulence generating member generates a turbulent flow in the coolant flowing toward the coolant jacket, and causes the coolant to flow substantially uniformly into the coolant jacket, thereby improving the cooling efficiency.

Patent Document 1: Japanese Unexamined Patent Application, Publication No. 2002-119019

SUMMARY OF THE INVENTION

The coolant jacket of the above-described water jacket of the known art has a large width and extends in the circumferential direction of the stator housing, which is a heat generating portion, such that the coolant jacket surrounds the stator housing. Therefore, even though the turbulence generating member generates a turbulent flow in the coolant flowing into the coolant jacket, the effect of the turbulent flow attenuates while the coolant is flowing in the flow path of the coolant jacket that is curved in the circumferential direction of the stator housing. Thus, the water jacket of the known art has room for improvement from the viewpoint of causing the entire coolant jacket to efficiently perform cooling.

It is an object of the present invention to provide a water jacket capable of cooling a heat generating portion with improved efficiency, and a method of manufacturing such a water jacket.

A first aspect of the present invention is directed to a water jacket (e.g., a water jacket 1 to be described later) including a housing (e.g., a housing 2 to be described later) configured to be disposed on or adjacent to an outer periphery of a heat generating portion (e.g., a stator core 101 to be described later) and a coolant channel (e.g., a coolant channel 3 to be described later) provided inside the housing. The coolant channel includes a plurality of main tubular channel portions (e.g., main tubular channel portions 31 to be described later) that extend linearly and are configured to be arranged along and in proximity to the outer periphery of the heat generating portion, an inflow-side manifold portion (e.g., an inflow-side manifold portion 32 to be described later) that collectively connects upstream end portions (e.g., upstream end portions 31a to be described later) of the main tubular channel portions and is configured to allow inflow of coolant, and an outflow-side manifold portion (e.g., an outflow-side manifold portion 33 to be described later) that collectively connects downstream end portions (e.g., downstream end portions 31b to be described later) of the main tubular channel portions and is configured to allow outflow of the coolant. Each of the main tubular channel portions includes therein a vortex generation part (e.g., a vortex generation part 4 to be described later) that is disposed in proximity to the upstream end portion and configured to generate a vortex flow.

A second aspect of the present invention is an embodiment of the first aspect. In the second aspect, the vortex generation part may include a plurality of deflection plates (e.g., deflection plates 41 to be described later) that deflect a flow of the coolant, in the main tubular, channel portion in an identical direction along a circumferential direction (e.g., a direction D4 to be described later) of the main tubular channel portion.

A third aspect of the present invention is an embodiment of the second aspect. In the third aspect, the plurality of deflection plates may be integrated with an inner wall surface (e.g., an inner wall surface 31c to be described later) of the main tubular channel portion.

A fourth aspect of the present invention is directed to a method of manufacturing the water jacket according to any one of the first to third aspects as a one-piece article. The method includes performing additive manufacturing using a metal material.

According to the first aspect, the vortex generation parts can generate a vortex flow in the main tubular channel portions, which form part of the coolant channel and extend linearly, whereby the coolant channel increases in heat; transferability and can cool the heat generating portion with further improved efficiency.

According to the second aspect, a vortex flow can be easily generated in each main tubular channel portion by the plurality of deflection plates provided in the main tubular channel portion.

According to the third aspect, the plurality of deflection plates extending from the inner wall surface of each main tubular channel portion can more efficiently generate a vortex flow in the main tubular channel portion.

According to the fourth aspect, the water jacket capable of cooling the heat generating portion with further improved efficiency can be easily manufactured using a 3D printer. In addition, a vortex flow generated by the vortex generation part in each main tubular channel portion enhances performance for removing the metal material remaining in the coolant channel after completion of the forming process.

BRIEF DESCRIPTION OF THE DRAWINGS

FIG. 1 is a longitudinal sectional view illustrating an electric motor provided with a water jacket according to an embodiment of the present invention;

FIG. 2 is a perspective view illustrating only a coolant channel provided inside the water jacket according to the embodiment;

DETAILED DESCRIPTION OF THE INVENTION

Figure 3:
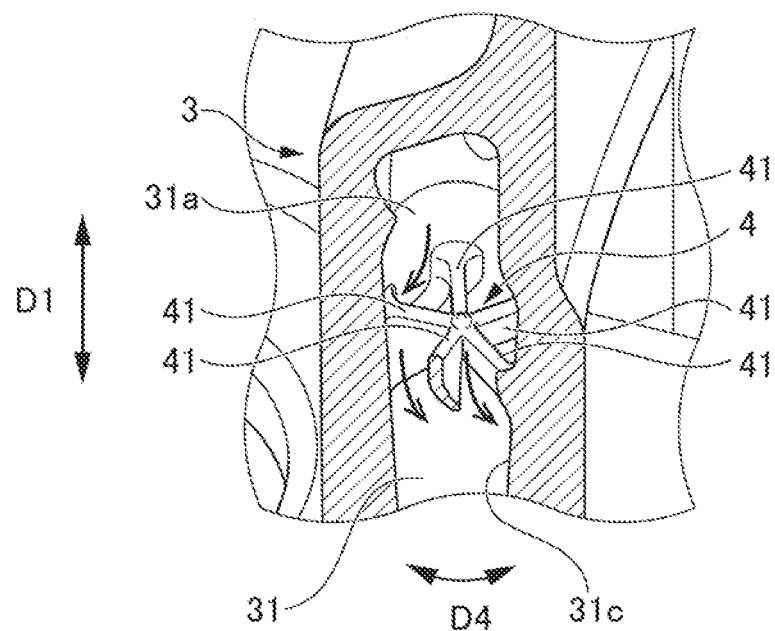
FIG. 3 is a partially-cutaway perspective view illustrating a vortex generation part in a main tubular channel portion at the portion denoted with A in FIG. 1.

Embodiments of the present invention will be described in detail with reference to the accompanying drawings. FIG. 1 illustrates an electric motor 100 provided with a water jacket 1 according to the present embodiment. The arrows in FIG. 1 respectively indicate, for the electric motor 100, an axial direction denoted by D1 and a radial direction denoted by D2.

The electric motor 100 includes a stator core 101 having a substantially cylindrical shape and extending in the axial direction, and a rotor 102 rotatably supported in a shaft hole 101*a* of the stator core 101. The stator core 101 is made of an iron-based metal material, and has a plurality of slots 101*b* accommodating coils 103.

When the electric motor 100 is driven, heat of the coils 103 is transmitted to the stator core 101, and the stator core 101 generates heat. The water jacket 1 cools the coils 103 through the stator core 101. In the present embodiment, the stator core 101 is a heat generating portion to be cooled by the water jacket 1.

The water jacket 1 is disposed radially outward of the stator core 101 of the electric motor 100. The water jacket 1 includes a housing 2 that is configured to be disposed on or adjacent to the outer periphery of the stator core 301, and a coolant channel 3 that has a tubular shape, is provided inside the housing 2, and allows coolant for cooling the stator core 101 to flow therethrough.

The housing 2 is made of a metal material having good thermal conductivity, such as an aluminum-based material or a copper-based material, and has a shape that surrounds the entire outer periphery of the stator core 101. The housing 2 is thermally connected to an outer peripheral surface 101*c* of the stator core 101. The housing 2 of the present embodiment is in direct contact with the outer peripheral surface 101*c* of the stator core 101. However, the housing 2 may be thermally connected to the outer peripheral surface 101*c* of the stator core 101 via a heat transferable material such as a heat conductive medium containing fine metal particles.

As illustrated in FIG. 2, the coolant channel 3 through which the coolant flows is formed inside the housing 2. The coolant channel 3 includes a plurality of main tubular channel portions 31, at least one inflow-side manifold portion 32, and at least one outflow-side manifold portion 33.

The main tubular channel portions 31 are disposed in proximity to the outer peripheral surface 101*c* of the stator core 101. The main tubular channel portions 31 of the present embodiment extend linearly in the axial direction of the stator core 101. However, the main tubular channel portions 31 may be provided so as to extend in the circumferential direction of the stator core 101. In the housing 2, the plurality of main tubular channel portions 31 are arranged in parallel at regular Intervals in a direction D3 that is along the outer periphery of the stator core 101 such that the main tubular channel portions 31 surround the stator core 101. The main tubular channel portions 31 of the present embodiment are each configured to allow the coolant to flow in the top-to-bottom direction in FIGS. 1 and 2.

The inflow-side manifold portion 32 has an annular shape adapted to be disposed along the outer periphery of the stator core 101. The inflow-side manifold portion 32 collectively connects upstream end portions 31*a* of all the main tubular channel portions 31 such that the inflow-side manifold portion 32 communicates with the inside of each of the main tubular channel portions 31. As illustrated in FIG. 2, at least, one inflow pipe 321 that allows the coolant to flow into the coolant channel 3 is connected to the inflow-side manifold portion 32.

The outflow-side manifold portion 33 has an annular shape adapted to be disposed along the outer periphery of the stator core 101, similarly to the inflow-side manifold portion 32. The outflow-side manifold portion 33 collectively connects downstream end portions 31*b* of all the main tubular channel portions 31 such that the outflow-side manifold portion 33 communicates with the inside of each of the main tubular channel portions 31. As illustrated in FIG. 2, at least one outflow pipe 331 that allows the coolant to flow into the coolant channel 3 is connected to the outflow-side manifold portion 33.

Each of the main tubular channel portions 31 includes therein a vortex generation part 4 that causes the coolant passing through the main tubular channel portion 31 to form a vortex flow. As illustrated in FIGS. 1 and 2, the vortex generation part 4 is disposed in proximity to the upstream end portion 31*a* of the main tubular channel portion 31. Providing the vortex generation parts 4 allows vortex flows to be easily generated in the main tubular channel portions 31, thereby improving the heat transferability of the coolant channel 3. As a result, a temperature gradient in the main tubular channel portions 31 significantly decreases in steepness, and the cooling efficiency for the stator core 101 as a heat generating portion is further improved.

Figure 4:
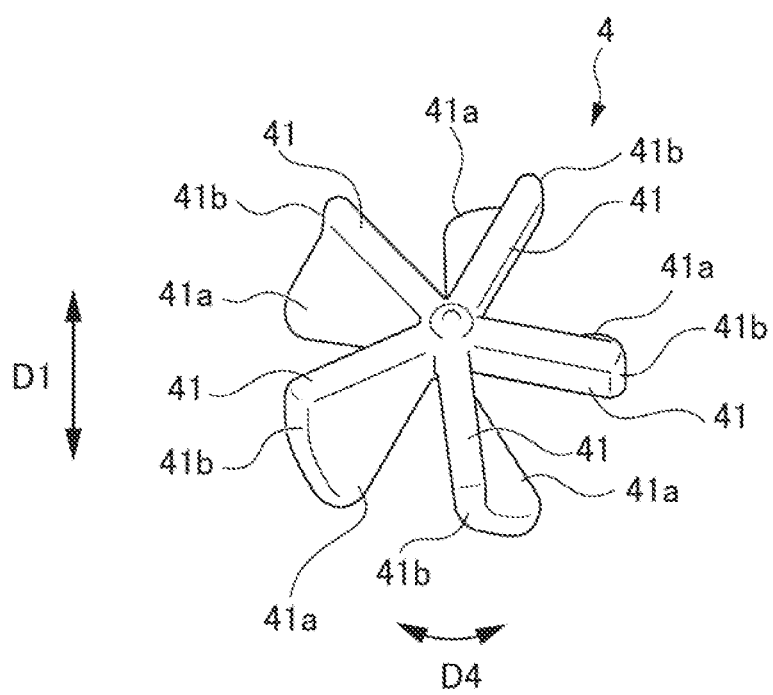
FIG. 4 is a perspective view illustrating only the vortex generation part according to the embodiment.

As illustrated in FIGS. 3 and 4, the vortex generation part 4 of the present embodiment includes a plurality of deflection plates 41 arranged along the circumferential direction (a direction D4 in FIGS. 3 and 4) of the main tubular channel portion 31. The plurality of deflection plates 41 of the present embodiment extend in radial directions from the radial center of the main tubular channel portion 31 toward an inner wall surface 31*c* of the main tubular channel portion 31. However, the plurality of deflection plates 41 may be provided so as to extend from the inner wall surface 31*c* of the main tubular channel, portion 31 toward the radial center of the main tubular channel portion 31. The vortex generation part 4 of the present embodiment includes five deflection plates 41, but the number of deflection plates 41 is not limited to five.

The deflection plates 41 each have a downstream end 41*a* in terms of a flow direction of the coolant. The downstream ends 41*a* are curved in an identical direction along the circumferential direction of the main tubular channel portion 31. Consequently, as indicated by arrows in the main tubular channel portion 31 illustrated in FIG. 3, the plurality of deflection plates 41 deflect the flow of the coolant in the main tubular channel portion 31 in the identical direction along the circumferential direction of the main tubular channel portion 31. Therefore, after flowing from the inflow-side manifold portion 32 into each main tubular channel portion 31, the coolant collides with the plurality of deflection plates 41 of the vortex generation part 4 and thereby passes through the main tubular channel portion 31 in the form of a vortex flow. Since the vortex generation part 4 is disposed in proximity to the upstream end portion 31*a* of the main tubular channel portion 31, the coolant that has entered the main tubular channel portion 31 can be maintained in the form of a vortex flow over the entire length of the main tubular channel portion 31 extending linearly toward the outflow-side manifold portion 33.

As illustrated in FIG. 3, the plurality of deflection plates 41 of the vortex generation part 4 of the present embodiment are integrated with the inner wall surface 31*c* of the main tubular channel portion 31. Specifically, the deflection plates 41 illustrated in FIG. 4 each have its outer end 41*b* connected to the inner wall surface 31*c*. This configuration makes it possible to deflect the coolant flowing along the inner wall surface 31*c* of the main tubular channel portion 31 by causing the coolant to collide with the deflection plates 41, whereby the entire coolant flowing through the main tubular channel portion 31 is efficiently brought into the form of a vortex flow. Thus, the vortex generation part 4 of the present embodiment can further efficiently generate a vortex flow in the main tubular channel portion 31.

The water jacket 1 with the above-described configuration can be manufactured by way of an additive manufacturing method, according to which the housing 2 and the coolant channel 3 having the vortex generation parts 4 inside the main tubular channel portions 31 are formed by layering the same metal material (e.g., powder metal or metal wire). According to this manufacturing method, the housing 2 and the coolant channel 3 having the vortex generation parts A inside the main tubular channel portions 31 can be easily formed as a one-piece article, using a 3D printer. Examples of the metal material include aluminum-based materials and copper-based materials having good thermal conductivity.

The additive manufacturing method employing a 3D printer and using powder metal as the metal material can be carried out in the following manner, for example. The powder metal is spread over a base plate. A step of melting a portion of the powder metal to be formed, by irradiation of a laser or an electron beam as a heat source, a step of solidifying the metal powder, and a step of moving the base plate to spread new powder metal over the base plate are repeated, whereby the water jacket 1 is three-dimensionally formed in a layered manner along the direction D1, which is the length direction of the main tubular channel portions 31. According to this additive manufacturing method, the water jacket 1 capable of cooling the stator core 101 with further improved efficiency can be easily manufactured using a 3D printer. In addition, a vortex flow generated in each main tubular channel portion 31 by the vortex generation part A enhances performance for removing the metal material remaining in the coolant channel 3 after the completion of the forming process.

In summary, the water jacket 1 according to the present embodiment provides the following advantages. The water jacket 1 according to the present embodiment includes the housing 2 configured to be disposed on or adjacent to the outer periphery of the stator core 101 as a heat, generating portion and the coolant channel 3 provided inside the housing 2. The coolant channel 3 includes the plurality of main tubular channel portions 31 that extend linearly and are configured to be arranged along and in proximity to the outer periphery of the stator core 101, the inflow-side manifold portion 32 that collectively connects the upstream end portions 31a of the main tubular channel portions 31 and is configured to allow inflow of the coolant, and the outflow-side manifold portion 33 that collectively connects the downstream end portions 31b of the main tubular channel portions 31 and is configured to allow outflow of the coolant. Each of the main tubular channel portions 31 includes therein the vortex generation part 4 that is disposed in proximity to the upstream end portion 31a and configured to generate a vortex flow. According to this configuration, the vortex generation parts 4 can generate a vortex flow in the main tubular channel portions 31, which form part of the coolant channel 3 and extend linearly, whereby the coolant channel 3 increases in heat transferability and can cool the stator core 101 with further improved efficiency.

The vortex generation part 4 of the present embodiment includes the plurality of deflection plates 41 that deflect a flow of the coolant in the main tubular channel portion 31 in an identical direction along the circumferential direction of the main tubular channel portion 31. According to this configuration, a vortex flow can be easily generated in each main tubular channel portion 31 by the plurality of deflection plates 41 provided in the main tubular channel portion 31.

The plurality of deflection plates 41 of the present embodiment are integrated with the inner wall surface 31c of the main tubular channel portion 31. According to this configuration, the plurality of deflection plates 41 extending from the inner wall surface 31c of each main tubular channel portion 31 can more efficiently generate a vortex flow in the main tubular channel portion 31.

According to the present embodiment, a method of manufacturing the water jacket 1 as a one-piece article includes performing additive manufacturing using a metal material. According to this method, the water jacket 1 capable of cooling the stator core 101 with further improved efficiency can be easily manufactured using a 3D printer. In addition, a vortex flow generated by the vortex generation part 4 in each main tubular channel portion 31 enhances performance for removing the metal material remaining in the coolant channel 3 after completion of the forming process.

Although the water jacket 1 described in the above embodiment is configured to be provided to the electric motor 100 having the stator core 101 as a heat generating portion, the heating portion is not limited to the electric motor 100. The water jacket 1 can be provided on or adjacent to various heat generating portions that are required to be cooled by a coolant.

EXPLANATION OF REFERENCE NUMERALS

1: Water jacket
2: Housing
3: Coolant channel
31: Main tubular channel portion
31a: Upstream end portion
31b: Downstream end portion
31c: Inner wall surface
32: Inflow-side manifold portion
33: Outflow-side manifold portion
4: Vortex generation part
41: Deflection plate
101: Stator core (heat generating portion)

What is claimed is:
1. A water jacket comprising:
a housing configured to be disposed on or adjacent to an outer periphery of a heat generating portion; and
a coolant channel provided inside the housing,
the coolant channel comprising:
a plurality of main tubular channel portions that, extend linearly and are configured to be arranged along and in proximity to the outer periphery of the heat generating portion,
an inflow-side manifold portion that collectively connects upstream end portions of the main tubular channel portions and is configured to allow inflow of coolant, and
an outflow-side manifold portion that collectively connects downstream end portions of the main tubular channel portions and is configured to allow outflow of the coolant, each of the main tubular channel portions including therein a vortex generation part that is disposed in proximity to the upstream end portion and configured to generate a vortex flow.
2. The water jacket according to claim 1, wherein
the vortex generation part includes a plurality of deflection plates that deflect a flow of the coolant in the main tubular channel portion in an identical direction along a circumferential direction of the main tubular channel portion.

3. The water jacket according to claim 2, wherein the plurality of deflection plates are integrated with an inner wall surface of the main tubular channel portion.

4. A method of manufacturing the water jacket according to claim 1 as a one-piece article, the method comprising: performing additive manufacturing using a metal material.

* * * * *